(12) United States Patent
Lin et al.

(10) Patent No.: US 8,914,799 B2
(45) Date of Patent: Dec. 16, 2014

(54) HIGH PERFORMANCE IMPLEMENTATION OF THE OPENMP TASKING FEATURE

(75) Inventors: Yuan Lin, Cupertino, CA (US); Xi Qian, Beijing (CN)

(73) Assignee: Oracle America Inc., Redwood Shores, CA (US)

( * ) Notice: Subject to any disclaimer, the term of this patent is extended or adjusted under 35 U.S.C. 154(b) by 867 days.

(21) Appl. No.: 12/495,403

(22) Filed: Jun. 30, 2009

(65) Prior Publication Data

US 2010/0333091 A1 Dec. 30, 2010

(51) Int. Cl.
  *G06F 9/46* (2006.01)
  *G06F 9/44* (2006.01)
  *G06F 9/48* (2006.01)
  *G06F 9/52* (2006.01)

(52) U.S. Cl.
  CPC .............. *G06F 8/314* (2013.01); *G06F 9/4843* (2013.01); *G06F 9/522* (2013.01)
  USPC .......................................... 718/102; 718/108

(58) Field of Classification Search
  USPC ....................................................... 709/220
  See application file for complete search history.

(56) References Cited

U.S. PATENT DOCUMENTS

| | | | | |
|---|---|---|---|---|
| 5,394,549 A | * | 2/1995 | Stringfellow et al. | 718/100 |
| 5,966,547 A | * | 10/1999 | Hagan et al. | 710/57 |
| 6,292,856 B1 | * | 9/2001 | Marcotte | 710/39 |
| 6,823,351 B1 | * | 11/2004 | Flood et al. | 1/1 |
| 7,581,045 B2 | * | 8/2009 | Wiegert et al. | 710/61 |
| 8,108,656 B2 | * | 1/2012 | Katragadda et al. | 712/215 |
| 2002/0108025 A1 | * | 8/2002 | Shaylor | 711/203 |
| 2008/0066066 A1 | * | 3/2008 | MacPherson | 718/100 |
| 2008/0114937 A1 | * | 5/2008 | Reid et al. | 711/117 |
| 2009/0172014 A1 | * | 7/2009 | Huetter | 707/103 R |

OTHER PUBLICATIONS

Frigo, Matteo, et al., "The Implementation of the Cilk-5 Multithreaded Language", http://supertech.csail.mit.edu/papers/cilk5.pdf, Published Jun. 1998 in Proceedings of the 1998 ACM SIGPLAN Conference on Programming Language Design and Implementation, (12 Pages).
OpenMP Application Program Interface, Version 3.0 May 2008, http://openmp.org/mp-documents/spec30.pdf, Copyright a 1997-2008 OpenMP Architecture Review Board, (326 Pages).

* cited by examiner

*Primary Examiner* — Meng An
*Assistant Examiner* — Wissam Rashid
(74) *Attorney, Agent, or Firm* — Osha • Liang LLP

(57) ABSTRACT

A method and system for creating and executing tasks within a multithreaded application composed according to the OpenMP application programming interface (API). The method includes generating threads within a parallel region of the application, and setting a counter equal to the quantity of the threads. The method also includes, for each one of the plurality of threads, assigning an implicit task, and executing the implicit task. Further, the method includes, upon encountering a task construct, during execution of the implicit tack, for an explicit asynchronous task generating the explicit asynchronous task, adding the explicit asynchronous task to a first task queue, where the first task queue corresponds to the one of the plurality of threads; and incrementing the counter by one.

20 Claims, 7 Drawing Sheets

HIGH PERFORMANCE IMPLEMENTATION OF THE OPENMP TASKING FEATURE

BACKGROUND

A typical computer system includes hardware and software. The hardware includes at least one processing device that executes instructions defined by the software (i.e., an application). The processing device may be a processor, a micro-core on a multi-core processor, or other such device that can process instructions. Often a computer system may include multiple processing devices that execute the application(s) in parallel. For example, multiple processors and/or multiple micro-cores may execute in parallel. Parallel execution may shorten the amount of time required to process the instructions of the application. Thus, parallel applications, or applications developed to be executed in parallel, tend to execute faster than applications that execute serially.

One Application Program Interface (API) that may be used to develop parallel applications is OpenMP. The OpenMP API supports multi-platform shared-memory parallel programming in C/C++ and Fortran on various processor architectures. Further, the OpenMP API includes compiler directives, library routines, and environment variables that influence run-time behavior.

SUMMARY

In general, in one aspect, the invention relates to a system including a processor, a physical memory, and a computer usable storage medium having computer readable program code embodied therein. The computer readable program code is adapted to, when executed by the processor, implement a method for generating tasks for a parallel processing application. The method includes generating threads within a parallel region of the application, and setting a counter equal to the quantity of the threads. The method also includes, for each one of the plurality of threads, assigning an implicit task, and executing the implicit task. Further, the method includes, upon encountering a task construct, during execution of the implicit tack, for an explicit asynchronous task: generating the explicit asynchronous task, adding the explicit asynchronous task to a first task queue, where the first task queue corresponds to the one of the plurality of threads, and incrementing the counter by one.

In general, in one aspect, the invention relates to a computer readable storage medium having computer readable program code embodied therein. The computer readable program code is adapted to, when executed by a processor, implement a method for generating a task for a parallel processing application. The method includes: receiving an indication of a requirement to generate the task, and determining that the task is synchronous. The method further includes, in response to determining that the task is synchronous, allocating the task on a stack, and generating the task.

In general, in one aspect, the invention relates to a computer readable storage medium having computer readable program code embodied therein. The computer readable program code is adapted to, when executed by a processor, implement a method for generating a task for a parallel processing application. The method includes receiving an indication of a requirement to generate the task. The method further includes determining that the task is asynchronous, and, in response to determining that the task is asynchronous, allocating the task on a heap, allocating at least one parameter associated with the task on the heap, and generating the task.

Other aspects of the invention will be apparent from the following description and the appended claims.

DETAILED DESCRIPTION

Figure 1:
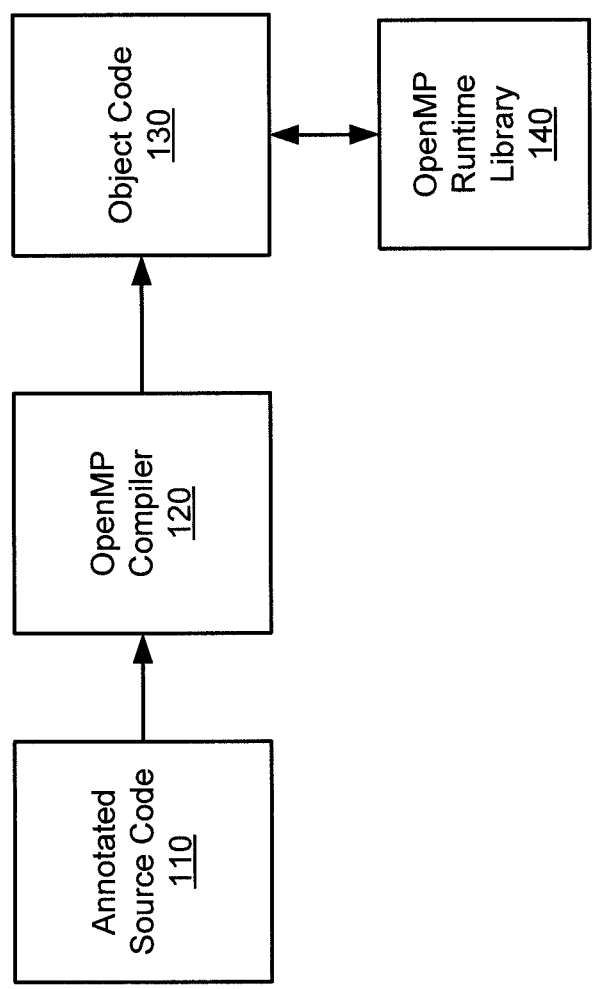
FIG. 1 shows a block diagram of the compilation of an OpenMP program, in accordance with embodiments of the invention.

Specific embodiments of the invention will now be described in detail with reference to the accompanying Figs. Like elements in the various Figs. are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Those skilled in the art will appreciate that while the invention is described with respect to OpenMP, the invention is not limited to OpenMP implementations.

In general, embodiments of the invention relate to a method and system for executing a computer application. More specifically, embodiments of the invention relate to a method and system for creating and executing tasks within a multi-threaded application composed according to the OpenMP application programming interface (API). An OpenMP application may include tasks, i.e., specific units of executable code along with the corresponding data environment (e.g., parameters for execution) which may be executed by a thread. A task may be generated when a thread encounters a task construct or a parallel construct.

FIG. 1 shows a block diagram of the compilation of an OpenMP program, in accordance with embodiments of the invention. As shown, the OpenMP program begins as annotated source code (110). For example, a programmer may compose the annotated source code (110) utilizing a programming language (e.g., C, C++, Fortran, etc.), and may include OpenMP directives in the annotated source code (110). For example, such OpenMP directives may include instructions specifying which portions of the program are executed in parallel, how such parallel portions are allocated to threads, and the like. As shown in FIG. 1, the annotated source code (110) may be compiled by an OpenMP compiler (120) (or any other compiler with appropriate functionality) to produce an object code (130). During runtime, the object code (130) may call OpenMP runtime libraries (140), which may provide routines and environment variables used in executing the object code (130).

Figure 2:
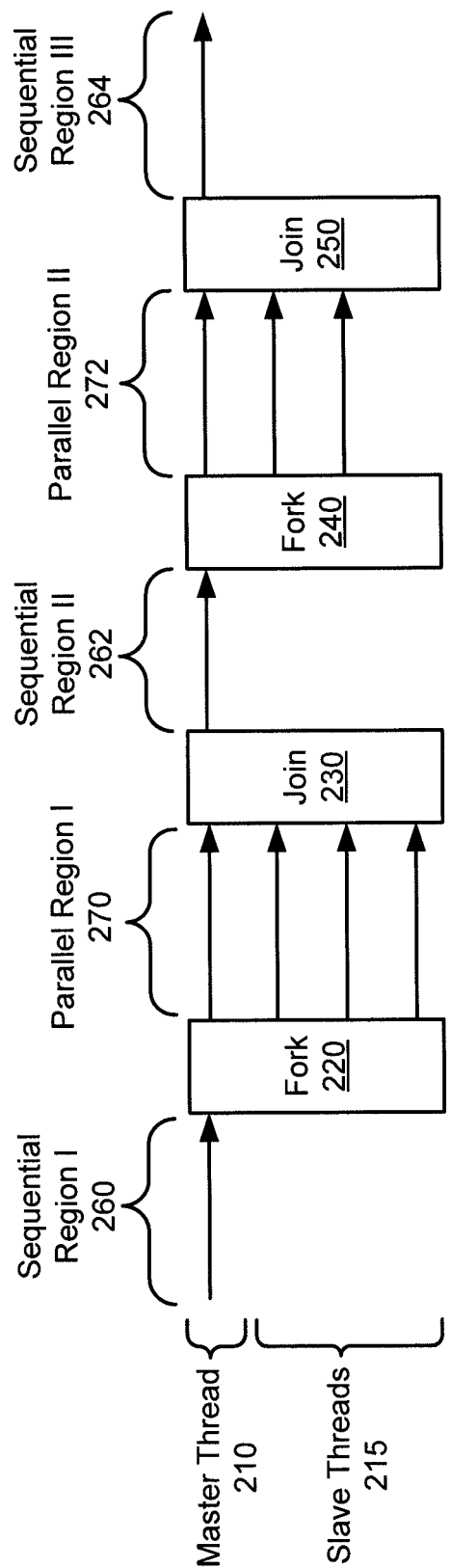
FIG. 2 shows a diagram of the execution of an OpenMP program, in accordance with embodiments of the invention.

Generally, an OpenMP program uses the fork-join model of parallel execution. Specifically, multiple threads of execution perform tasks defined implicitly or explicitly by OpenMP directives included in the program (e.g., the annotated source code (110) shown in FIG. 1). FIG. 2 shows a diagram of the execution of an OpenMP program, in accordance with embodiments of the invention.

As shown in FIG. 2, the OpenMP program begins in a first sequential region (260), with execution of a single master thread (210). The first sequential region (260) terminates when the master thread (210) encounters a fork (220). As shown, the fork (220) may create a team of slave threads (215) that, along with the master thread (210), execute in a first parallel region (270). In one embodiment, the fork (220) may represent a parallel construct, meaning an OpenMP directive specifying the parallel execution of multiple threads. Further, such a parallel construct may specify an implicit task associated with each thread. In particular, each implicit task may be tied to a particular thread, meaning the implicit task is always executed by a thread to which it is initially assigned.

In one or more embodiments, any thread within the first parallel region (270) may encounter a task construct (not shown), meaning an OpenMP directive specifying the creation of a new task. Such tasks are referred to as explicit tasks, and may be defined by the task construct as untied tasks (i.e., not necessarily continued by the thread which first executes the task) or tied tasks (i.e., tasks always continued by the thread which first executes the task). Further, explicit tasks may be defined by the task construct as synchronous (i.e., requiring immediate execution) or asynchronous (i.e., able to be executed at a later time).

Referring again to FIG. 2, after the first parallel region (270), the team of threads encounters a join (230). The join (230) represents a barrier, meaning a defined point in the program beyond which no thread in a team may proceed until all threads in the team have reached the barrier and all explicit tasks generated by the team have been completed. After the join (230), the master thread (210) executes alone in a second sequential region (262). Thereafter, the OpenMP program may enter one or more parallel regions as required by directives in the source code. For example, as shown in FIG. 2, the OpenMP program may encounter a second fork (240) to begin a second parallel region (272), thereby creating a second team of threads. After encountering a second join (250), the master thread (210) may enter a third sequential region (264).

Figure 3:
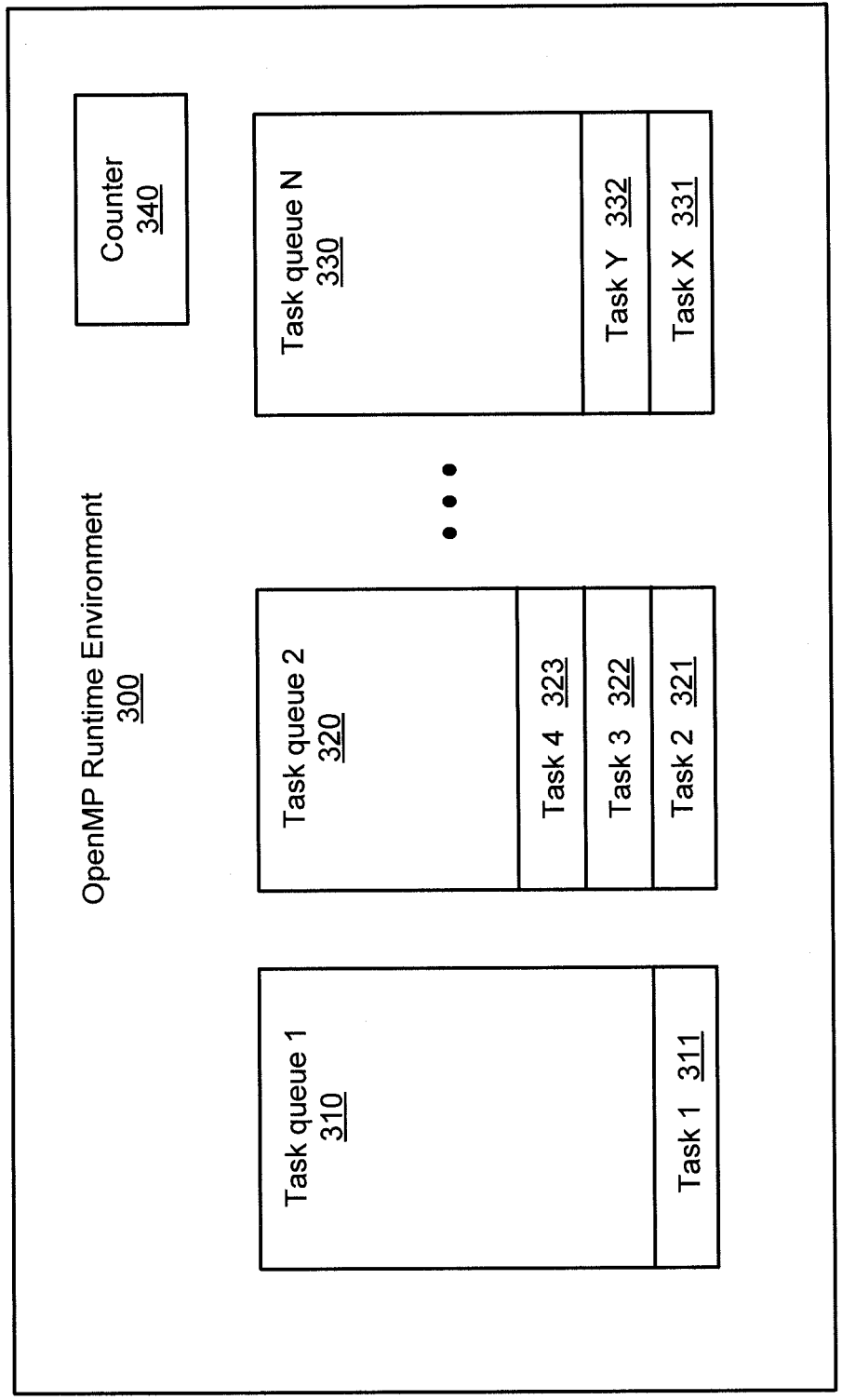
FIG. 3 shows a diagram of a OpenMP runtime environment, in accordance with embodiments of the invention.

FIG. 3 shows a diagram of a OpenMP runtime environment (300), in accordance with embodiments of the invention. In one or more embodiments, the OpenMP runtime environment (300) may include a counter (340) configured for use in tracking completion of all tasks created by a team of threads. The function of the counter (340) is described in greater detail below with reference to FIG. 4A.

Additionally, the OpenMP runtime environment (300) may also include one or more task queues (e.g., task queue 1 (310), task queue 2 (320), task queue N (330) shown in FIG. 3). In one or more embodiments, each task queue may be associated with a particular thread being executed in an OpenMP program. For example, assume that task queue 1 (310) is associated with the master thread (210) shown in FIG. 2, assume that task queue 2 (320) is associated with a particular slave thread (215) in the first parallel region (270) shown in FIG. 2, and so forth. As shown in FIG. 3, each task queue may include one or more tasks (e.g., task 1 (311), task 3 (322), task X (332), task Y (331), etc.) queued for an associated thread. In one or more embodiments, each task queue may be processed in a last-in, first-out (LIFO) manner. For example, referring to FIG. 3, assume task queue 2 (320) was loaded first with task 2 (321), then with task 3 (322), and finally with task 4 (323).

Accordingly, when processing the task queue 2 (320) in a LIFO manner, the first task to be dequeued would be task 4 (323).

Of course, one skilled in the art will appreciate that FIGS. 1-3 are merely exemplary illustrations of embodiments of the invention and, as such, as not intended to limit the scope of the invention. For example, while FIG. 2 illustrates two parallel regions, an OpenMP program may include any number of parallel regions, in accordance with requirements of a particular use or application. Further, one skilled in the art will appreciate that the terms used in this description have other recognized names. For example, a master thread may also be referred to as a primary thread, slave threads may be referred to as child or worker threads, and the like.

Figure 4A:
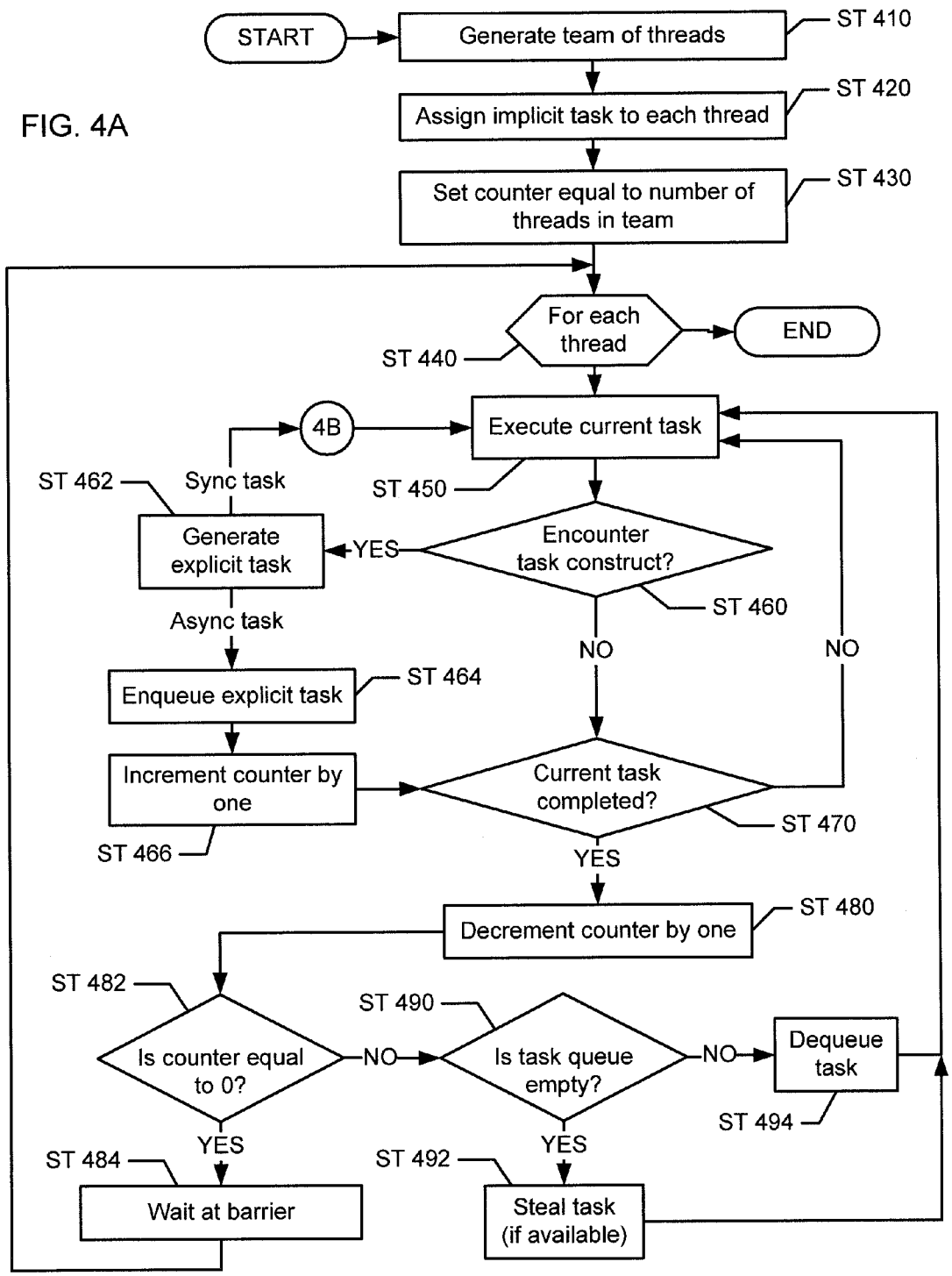
FIGS. 4A-4B show flow charts for executing tasks within a parallel region of an OpenMP program, in accordance with one or more embodiments of the invention.
Figure 4B:
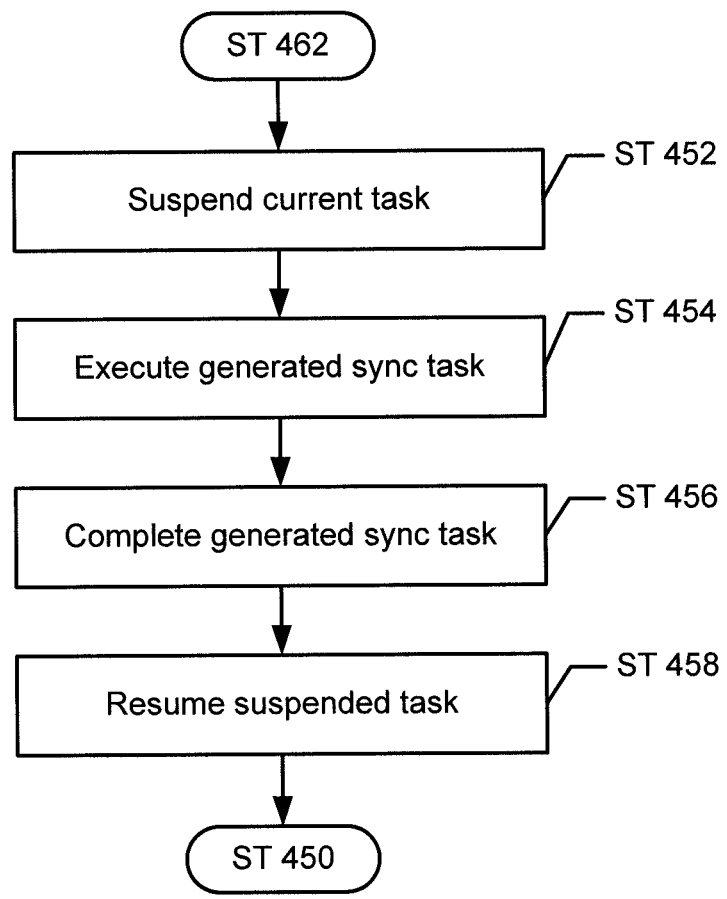

FIGS. 4A-4B show flow charts for executing tasks within a parallel region of an OpenMP program (e.g., first parallel region (270) shown in FIG. 2), in accordance with one or more embodiments of the invention. In one or more embodiments of the invention, one or more of the steps described below may be omitted, repeated, performed in parallel, and/or performed in a different order. Accordingly, the specific arrangement of steps shown in FIGS. 4A-4B should not be construed as limiting the scope of the invention.

At ST 410, a team of threads may be generated. For example, referring to FIG. 2, a master thread (210) executing an OpenMP program may encounter a fork (220) (e.g., a parallel construct), and may thus create multiple slave threads (215). At ST 420, an implicit task may be assigned to each thread in the team. At ST 430, a counter (e.g., counter (340) shown in FIG. 3) may be set equal to the number of threads in the team.

At ST 440, a loop to process each thread in the team may be entered. At ST 450, the thread executes a current task. For example, the thread may execute an implicit task assigned to the thread (at ST 420). At ST 460, a determination is made about whether the thread has encountered a task construct. If it is determined that the thread has not encountered a task construct, then at ST 470, a determination is made about whether the current task is completed. If it is determined that the current task is not completed, then at ST 450, the thread continues to execute the current task. However, if it is determined at ST 470 that the current task is completed, then the process continues at ST 480 (described below).

Returning to ST 460, if it is determined that the thread has encountered a task construct, then at ST 462, an explicit task may be generated. ST 462 is described in greater detail below with reference to FIG. 5. If the explicit task generated at ST 462 is an asynchronous task, then at ST 464, the explicit task may be enqueued on a task queue associated with the current thread (e.g., task queue 1 (310) shown in FIG. 3). However, in one or more embodiments, if the explicit task fails to be enqueued at ST 464 (e.g., the task queue 1 (310) is full), then the explicit task may be converted to a synchronous task (i.e., the explicit task is executed immediately).

At ST 466, the counter (e.g., counter (340) shown in FIG. 3) may be incremented by one. At ST 470, a determination is made about whether the current task is completed. If it is determined that the current task is completed, then at ST 480, the counter may be decremented by one. Note that, by incrementing the counter for each task generated (at ST 430 and ST 466), and decrementing the counter for each task completed (at ST 480), the counter tracks all tasks that remain to be completed by the entire team of threads.

At ST 482, a determination is made about whether the counter is equal to zero. If it is determined that the counter is not equal to zero (i.e., all tasks generated for the team of threads have not been completed), then at ST 490, a determination is made about whether the task queue for the current thread is empty. If it is determined that the task queue is not empty, then at ST 494, a task is dequeued from the task queue. In one embodiment, the task is dequeued in a LIFO manner. For example, referring to FIG. 3, assuming task 4 (323) was the last task added to task queue 2 (320), and thus task 4 (323) may be dequeued.

However, if it is determined at ST 490 that the task queue is empty, then at ST 492, the current thread may steal a task (if available) from a task queue associated with a different thread. After either ST 494 or ST 492, at ST 450, the current task (i.e., either the task dequeued at ST 494 or the task stolen at ST 492) may be executed.

Returning to ST 482, if it is determined that the counter is equal to zero (i.e., all tasks generated for the team of threads have been completed), then at ST 484, the current thread waits (e.g., sleeps or is otherwise suspended) at a barrier. In other words, the current thread has completed all required tasks, and is thus suspended in order to wait for the remaining threads of the team to complete processing. For example, referring to FIG. 2, assume one of the slave threads (215) waits at the join (230) for the remaining slave threads (215) and/or the master thread (210) to complete processing. After ST 484, the processing of the current thread through the loop (entered at ST 440) is complete. Of course, one of skill in the art will understand that the loop entered at ST 440 may represent the parallel processing of some or all of the threads in the team. In other words, the processing of a thread through the loop entered at ST 440 may occur simultaneously with the processing of other threads through the same loop.

Returning to ST 462, if the generated explicit task is a synchronous task, then the processing of the thread continues on the flowchart shown in FIG. 4B. In other words, FIG. 4B represents a continuation of the flowchart shown in FIG. 4A. After ST 462 (shown in FIG. 4A), at ST 452, the current task may be suspended. At ST 454, the generated synchronous task may be executed immediately (i.e., without being queued). At ST 456, the generated synchronous task may complete executing. At ST 458, the suspended task may resume executing. After ST 458, the flowchart continues at ST 450 (shown in FIG. 4A).

In one or more embodiments, when creating an explicit task ((i.e., ST 462 shown in FIG. 4A), it may be beneficial to allocate the explicit task on a stack rather than on a heap. For example, allocating an explicit task on a stack may be faster than allocating the explicit task on a heap. However, if an explicit task is allocated on a stack, it may be required that any descendant tasks of the explicit task must finish before the explicit task finishes.

Figure 5:
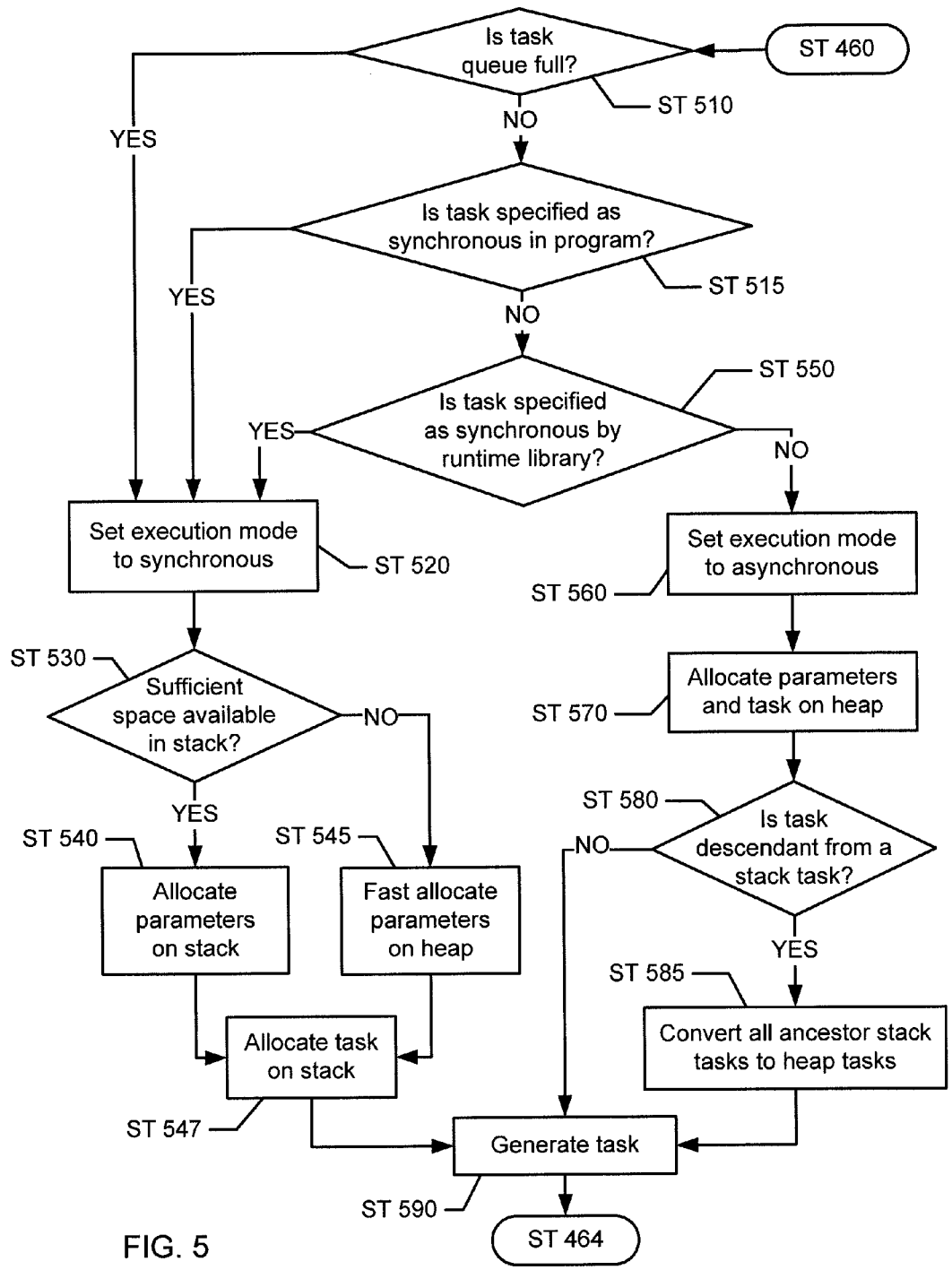
FIG. 5 shows a flow chart for generating an explicit task, in accordance with one or more embodiments of the invention.

FIG. 5 shows a flow chart for generating an explicit task, in accordance with one or more embodiments of the invention. In particular, FIG. 5 illustrates an exemplary expansion of the steps involved in performing ST 462 (shown in FIG. 4A). Further, in one aspect, FIG. 5 illustrates a method for allocating explicit tasks to a stack without having advance confirmation that any descendant tasks of the explicit task will finish before the explicit task finishes, in accordance with one or more embodiments of the invention.

In one or more embodiments of the invention, one or more of the steps described below may be omitted, repeated, performed in parallel, and/or performed in a different order. Accordingly, the specific arrangement of steps shown in FIG. 5 should not be construed as limiting the scope of the invention.

At ST 510, a determination is made about whether a task queue (e.g., task queue 1 (310) shown in FIG. 3) is full. If it is determined that the task queue is not full, then at ST 515, a determination is made about whether the explicit task is specified as synchronous within the OpenMP program (i.e., by the task construct defining the explicit task). If it is determined that the explicit task is not specified as synchronous within the OpenMP program, then at ST 550, a determination is made about whether the explicit task is specified as synchronous by a runtime library (e.g., OpenMP runtime library (140) shown in FIG. 1). If it is determined that the explicit task is not specified as synchronous by a runtime library, then at ST 560, the explicit task may be set to have an asynchronous execution mode.

At ST 570, the explicit task and associated parameters may be allocated on a heap. Such associated parameters may be variables that refer to data on which the task operates. For example, consider the following code segment:

```
int a = 1;
#pragma omp task firstprivate(a)
{
  ...;
}
```

In the above example, the task parameter "a" has the value "1." At ST 580, a determination is made about whether the explicit task is descendent from a stack task (i.e., a task allocated on a stack. Generally, a stack is a limited local memory space reserved for a function. In contrast, a heap is a global free memory area which may be allocated and kept valid until it is freed. Typically, memory in the stack may be allocated much faster than memory in the heap, due to the heap's complex allocation/free algorithm. However, the memory in the stack space is only valid until the function returns.

Returning to FIG. 5, if it is determined at ST 580 that the explicit task is descendent from a stack task, then at ST 585, any ancestor stack tasks may be converted to heap tasks. After ST 585, or if it is determined at ST 580 that the explicit task is not descendent from a stack task, then at ST 590, the explicit task is generated.

However, if it is determined at ST 510 that the task queue is full, or if it is determined at ST 515 that that the explicit task is specified as synchronous within the OpenMP program, or if it is determined at ST 550 that the explicit task is specified as synchronous by a runtime library, then at ST 520, the explicit task may be set to have an synchronous execution mode. Alternatively, if it is determined at ST 510 that the task queue is not full but previously had been full, the task is specified as synchronous unless the level of the task queue is below a predefined percentage threshold (e.g., 90% full, 80% full, etc.) and/or a predefined numerical threshold (e.g., 40 queued tasks, 120 queued tasks, etc.).

At ST 530, a determination is made about whether there is sufficient space on a stack for task parameters required by the explicit task. If it is determined that there is sufficient space on a stack, then at ST 540, the task parameters are allocated on the stack. However, if it is determined at ST 530 that there is not sufficient space on a stack, then at ST 545, the task parameters are allocated on the heap using a fast allocation method. For example, the task parameters may be allocated on the heap using the mt-unsafe fast allocation method, meaning allocating a block from a local free list (i.e., a list of free memory blocks for each thread) and then put it back when it is freed. After either ST 540 or ST 545, at ST 547, the explicit task is allocated on the stack. At ST 590, the explicit task is generated.

Embodiments of the invention provide improved creation, scheduling, and execution of OpenMP tasks. As described above, in one or more embodiments, tasks may be queued in a last-in, first-out (LIFO) queue associated with each thread, thereby simplifying the load on the compiler on runtime. Further, in one or more embodiments, each task may be allocated on either a stack or a heap according to various criteria, thereby allowing the use of faster stack memory without having to determine beforehand if each task will have unfinished descendant tasks. Additionally, in one or more embodiments, a counter may be configured to track all tasks created within a parallel region of the application, thereby allowing detection of termination of the tasks.

Use of the above-described embodiments of the invention have been shown to improve the performance of programs including OpenMP tasks. For example, Table I of test results (see below) shows substantial improvement in the performance of a quick sort algorithm when using embodiments of the invention.

TABLE I

Test Results Using Embodiments of the Invention

| | Threads | | | | | |
|---|---|---|---|---|---|---|
| | 1 | 2 | 4 | 8 | 12 | 16 |
| Original | 1.000 | 1.705 | 3.043 | 5.330 | 7.940 | 8.527 |
| Using Task Allocation | 1.000 | 1.977 | 3.859 | 7.552 | 10.741 | 11.376 |
| Using Task and Parameter Allocation | 1.000 | 1.971 | 3.884 | 7.630 | 11.179 | 13.778 |

As shown, when using 16 threads, embodiments of the invention (shown on the bottom row) are 13.8 times faster than a single thread. In contrast, when not using embodiments of the invention (shown on the top row), using 16 threads is only 8.5 times faster than a single thread. The above test results were generated on a Sun™ computer having four SPARC64-VII™ (impl 0x7 ver 0x90 clock 2520 MHz) physical processors. Each processor had four cores, and each core had two virtual processors. The test machine used the Solaris™ operating system developed by Sun Microsystems®), Inc. located in Santa Clara, Calif.

Figure 6:
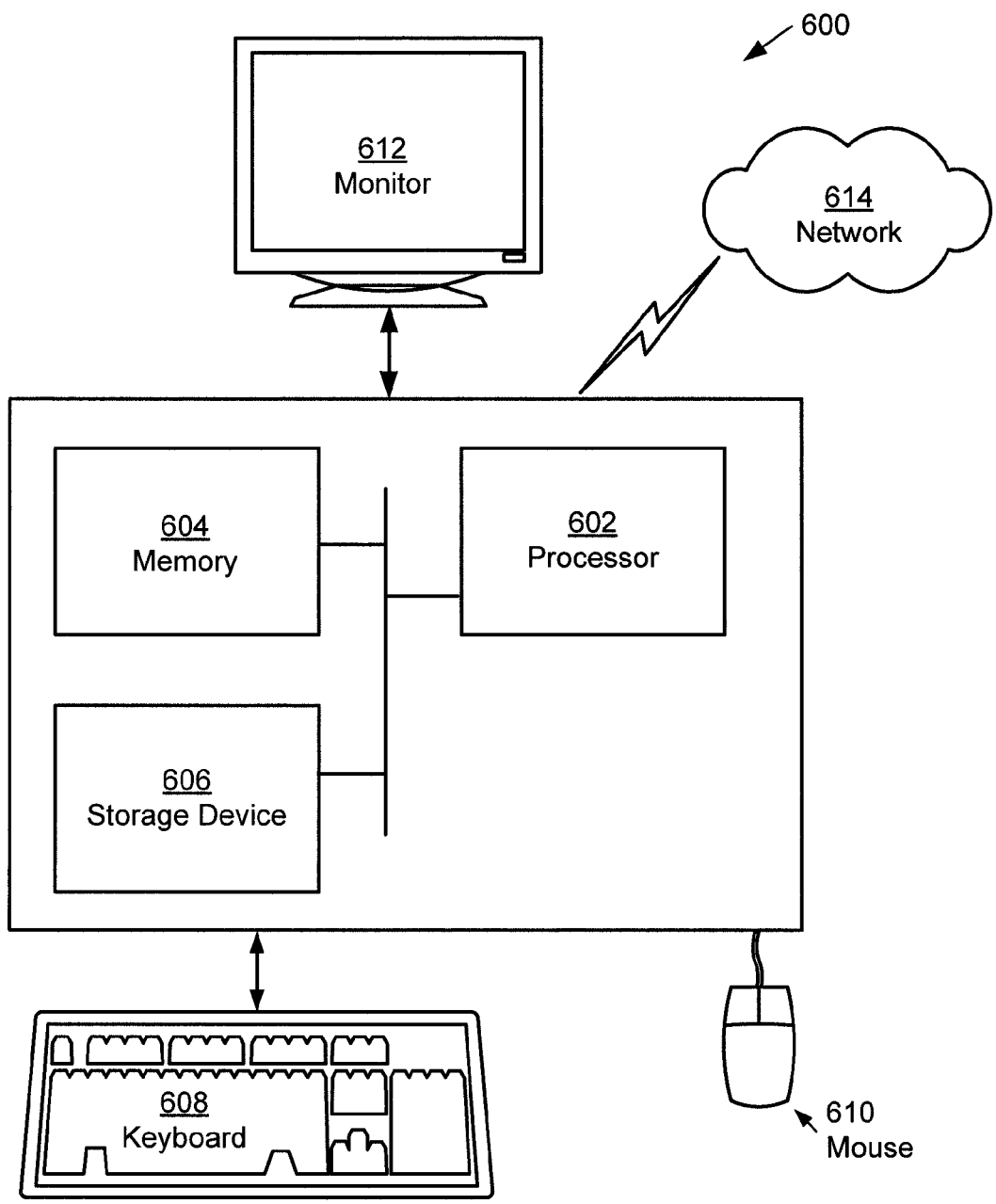
FIG. 6 shows a computer system in accordance with one or more embodiments of the invention

Embodiments of the invention may be implemented on virtually any type of computer regardless of the platform being used. For example, as shown in FIG. 6, a networked computer system (600) includes a processor (602), associated memory (604), a storage device (606), and numerous other elements and functionalities typical of today's computers (not shown). The networked computer (600) may also include input means, such as a keyboard (608) and a mouse (610), and output means, such as a monitor (612).

The networked computer system (600) is connected to a local area network (LAN) or a wide area network via a network interface connection (not shown). Those skilled in the art will appreciate that these input and output means may take other forms. Further, those skilled in the art will appreciate that one or more elements of the aforementioned computer (600) may be remotely located and connected to the other elements over a network. Further, software instructions to perform embodiments of the invention may be stored on a computer readable storage medium such as a compact disc (CD), a diskette, a tape, or any other physical computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A system, comprising:
   a processor;
   a memory; and
   a plurality of instructions stored in the memory that, when executed by the processor, perform the steps of:
   generating a plurality of threads within a parallel region of an application;
   setting a counter equal to a quantity of the plurality of threads;
   for each one of the plurality of threads:
      assigning an implicit task;
      executing the implicit task;
      upon encountering a task construct, during execution of the implicit task, for an explicit task:
         determining that a first task queue of a plurality of task queues is not full;
         setting an execution mode of the explicit task as an explicit asynchronous task within the task construct based on the determination that the first task queue is not full;
         converting at least one ancestor stack task to a heap task based on a determination that the explicit asynchronous task is descended from the at least one ancestor stack task;
         generating the explicit asynchronous task;
         adding the explicit asynchronous task to the first task queue,
         wherein the first task queue corresponds to the one of the plurality of threads,
         wherein each of the plurality of task queues corresponds to one of the plurality of threads, and
         wherein the explicit asynchronous task is executed by allocating a data environment data structure for the explicit asynchronous task on a heap of a host routine; and
      incrementing the counter by one.

2. The system of claim 1, further comprising, upon completing the implicit task:
   decrementing the counter by one.

3. The system of claim 2, further comprising, upon determining that the counter is greater than zero:
   determining that the first task queue is not empty; and
   in response to determining that the first task queue is not empty, dequeuing a first queued task from the first task queue.

4. The system of claim 2, further comprising, upon determining that the counter is greater than zero:
   determining that the first task queue is empty; and
   in response to determining that the first task queue is empty, stealing a second queued task from a second task queue, wherein the second task queue corresponds to a different one of the plurality of threads.

5. The system of claim 2, further comprising, upon determining that the counter is equal to zero:
   suspending the one of the plurality of threads at a parallel region barrier.

6. The system of claim 1, further comprising, upon encountering a task construct for an explicit synchronous task:
   generating the explicit synchronous task;
   suspending a current task;
   executing the explicit synchronous task after suspending the current task; and upon completing the explicit synchronous task, resuming the current task.

7. The system of claim 1, wherein the application uses an OpenMP Application Programming Interface (API).

8. The system of claim 1, wherein the explicit asynchronous task is a tied task.

9. A non-transitory computer readable medium for generating tasks for a parallel processing application, comprising instructions for:
generating a plurality of threads within a parallel region of the application;
setting a counter equal to a quantity of the plurality of threads;
for each one of the plurality of threads:
assigning an implicit task;
executing the implicit task;
upon encountering a task construct, during execution of the implicit task, for an explicit task:
determining that a first task queue of a plurality of task queues is not full;
setting an execution mode of the explicit task as an explicit asynchronous task within the task construct based on the determination that the first task queue is not full;
converting at least one ancestor stack task to a heap task based on a determination that the explicit asynchronous task is descended from the at least one ancestor stack task;
generating the explicit asynchronous task;
adding the explicit asynchronous task to the first task queue,
wherein the first task queue corresponds to the one of the plurality of threads,
wherein each of the plurality of task queues corresponds to one of the plurality of threads, and
wherein the explicit asynchronous task is executed by allocating a data environment data structure for the explicit asynchronous task on a heap of a host routine; and
incrementing the counter by one.

10. The non-transitory computer readable medium of claim 9, further comprising instructions for decrementing the counter by one.

11. The non-transitory computer readable medium of claim 9, further comprising instructions for, upon determining that the counter is greater than zero:
determining that the first task queue is not empty; and
in response to determining that the first task queue is not empty, dequeuing a first queued task from the first task queue.

12. The non-transitory computer readable medium of claim 9, further comprising instructions for, upon determining that the counter is greater than zero:
determining that the first task queue is empty; and
in response to determining that the first task queue is empty, stealing a second queued task from a second task queue, wherein the second task queue corresponds to a different one of the plurality of threads.

13. The non-transitory computer readable medium of claim 9, further comprising instructions for, upon determining that the counter is equal to zero:
suspending the one of the plurality of threads at a parallel region barrier.

14. The non-transitory computer readable medium of claim 9, further comprising instructions for, upon encountering a task construct for an explicit synchronous task:
generating the explicit synchronous task;
suspending a current task;
executing the explicit synchronous task after suspending the current task; and
upon completing the explicit synchronous task, resuming the current task.

15. A method for generating tasks for a parallel processing application, comprising:
generating a plurality of threads within a parallel region of the application;
setting a counter equal to a quantity of the plurality of threads;
for each one of the plurality of threads:
assigning an implicit task;
executing the implicit task;
upon encountering a task construct, during execution of the implicit task, for an explicit task:
determining that a first task queue of a plurality of task queues is not full;
setting an execution mode of the explicit task as an explicit asynchronous task within the task construct based on the determination that the first task queue is not full;
converting at least one ancestor stack task to a heap task based on a determination that the explicit asynchronous task is descended from the at least one ancestor stack task;
generating the explicit asynchronous task;
adding the explicit asynchronous task to the first task queue,
wherein the first task queue corresponds to the one of the plurality of threads,
wherein each of the plurality of task queues corresponds to one of the plurality of threads, and
wherein the explicit asynchronous task is executed by allocating a data environment data structure for the explicit asynchronous task on a heap of a host routine; and
incrementing the counter by one.

16. The method of claim 15, further comprising, upon completing the implicit task:
decrementing the counter by one.

17. The method of claim 15, further comprising, upon determining that the counter is greater than zero:
determining that the first task queue is not empty; and
in response to determining that the first task queue is not empty, dequeuing a first queued task from the first task queue.

18. The method of claim 15, further comprising, upon determining that the counter is greater than zero:
determining that the first task queue is empty; and
in response to determining that the first task queue is empty, stealing a second queued task from a second task queue, wherein the second task queue corresponds to a different one of the plurality of threads.

19. The method of claim 15, further comprising, upon determining that the counter is equal to zero:
suspending the one of the plurality of threads at a parallel region barrier.

20. The method of claim 15, further comprising, upon encountering a task construct for an explicit synchronous task:
generating the explicit synchronous task;
suspending a current task;
executing the explicit synchronous task after suspending the current task; and upon completing the explicit synchronous task, resuming the current task.

\* \* \* \* \*

UNITED STATES PATENT AND TRADEMARK OFFICE
CERTIFICATE OF CORRECTION

PATENT NO. : 8,914,799 B2
APPLICATION NO. : 12/495403
DATED : December 16, 2014
INVENTOR(S) : Lin et al.

It is certified that error appears in the above-identified patent and that said Letters Patent is hereby corrected as shown below:

On title page, column 2, under Abstract, line 9, delete "tack," and insert -- task, --, therefor.

In the Specification

In column 2, line 19, delete "invention" and insert -- invention. --, therefor.

In column 6, line 43, delete "that that" and insert -- that --, therefor.

Signed and Sealed this
Eleventh Day of August, 2015

Michelle K. Lee
*Director of the United States Patent and Trademark Office*